April 1, 1958     L. O. CARLSEN ET AL     2,828,583

TOOL SHARPENING MACHINE AND METHOD

Filed July 12, 1954     3 Sheets-Sheet 1

INVENTORS
LEONARD O. CARLSEN
ROBERT F. PIGAGE
BY Richard W. Treverton
ATTORNEY

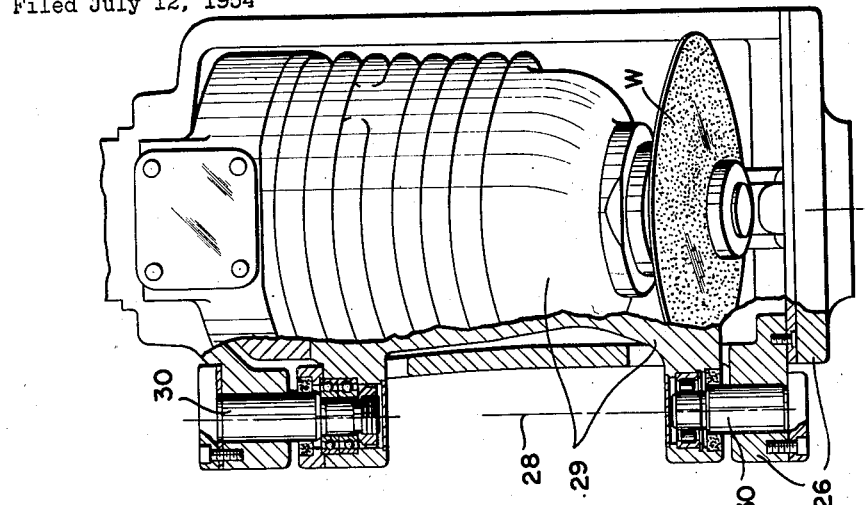
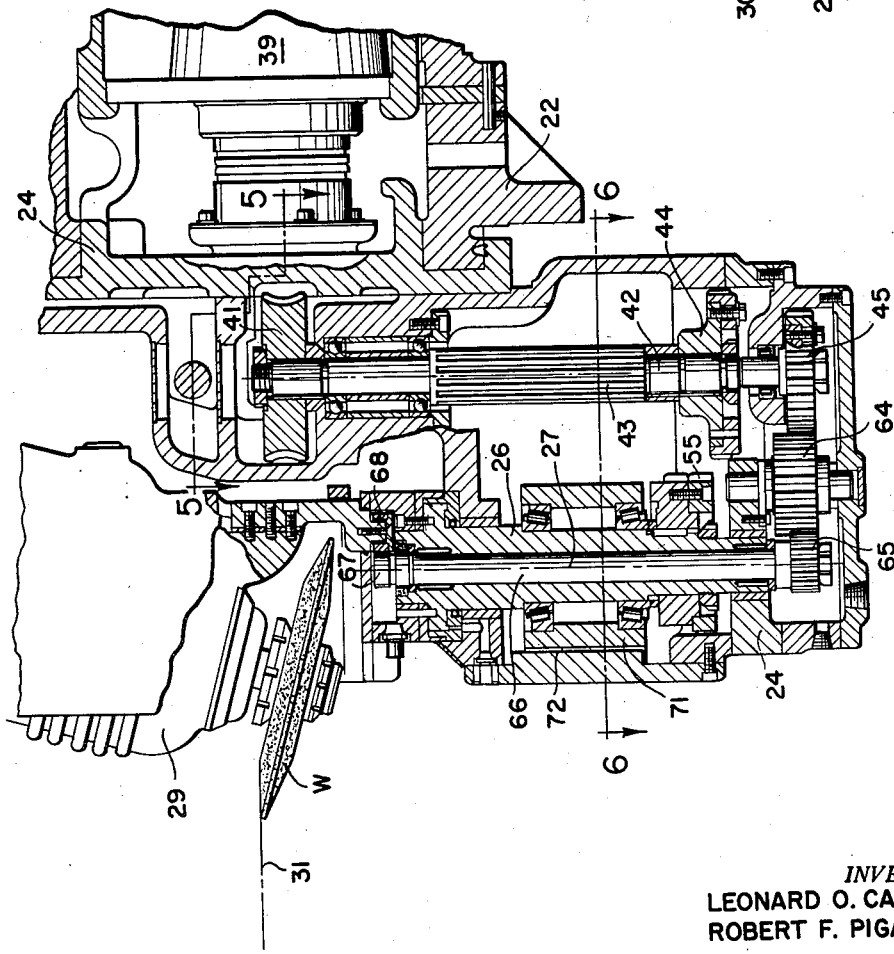

April 1, 1958     L. O. CARLSEN ET AL     2,828,583
TOOL SHARPENING MACHINE AND METHOD
Filed July 12, 1954     3 Sheets-Sheet 3

INVENTORS
LEONARD O. CARLSEN
ROBERT F. PIGAGE
BY *Richard W. Treverton*
ATTORNEY

United States Patent Office 2,828,583
Patented Apr. 1, 1958

2,828,583
TOOL SHARPENING MACHINE AND METHOD

Leonard O. Carlsen, Rochester, and Robert F. Pigage, Brighton, N. Y., assignors to The Gleason Works, Rochester, N. Y., a corporation of New York Application July 12, 1954, Serial No. 442,712

5 Claims. (Cl. 51—33)

The present invention relates to improvements in a tool sharpening machine, such improvements relating especially but not exclusively to machines of the general type disclosed in patent application Serial No. 375,870, filed August 24, 1953, and to a new method of sharpening tools which can be carried out on the improved machines.

A primary object of the invention is to reduce or eliminate the burr which is usually left on the cutting edge of a tool after a sharpening operation in which the front or cutting face of the tool is ground back by oscillating a rotating abrasive wheel back and forth across it. Such a burr not only interferes with proper cutting action of the tool but often interferes with the setting or gaging of the tool in its holder, thereby affecting the accuracy of the work cut with the tool. For example one kind of face mill cutter widely used for producing spiral bevel gears has a series of blades arranged in a circle on a rotary cutter head, the blades being individually adjustable, radially of the head, to true the cutter. If the gage that is employed in the truing operation rides on a burr rather than on the cutting edge itself, an incorrect adjustment results. Consequently it may be necessary to repeat the truing operation after the burrs have been removed by cutting one or more gears.

According to the present invention an edged cutting tool, which has a plane sharpening surface bounded on at least one side by a cutting edge, is sharpened by a relative stroking motion of a rotating abrasive wheel back and forth about an axis perpendicular to said surface, with a conical surface of said wheel having a cone element thereof disposed in the plane of said surface, which method comprises effecting back and forth motions of the wheel parallel to said plane toward and away from said axis in time with said stroking motion whereby during opposite strokes thereof the wheel traverses said cutting edge in different paths. It has been discovered that this not only produces a finer surface finish on the tool but also that it greatly reduces or eliminates burrs on the cutting edge of the tool. The improved machine for carrying out this method comprises a frame having a wheel support pivoted thereto for oscillation about a first axis, an abrasive wheel head carried by the support and pivoted thereto for oscillation about a second axis parallel to the first axis, a spindle for an abrasive wheel journaled in the head for rotation about a third axis inclined at an acute angle to said first axis, an abrasive wheel on said spindle having a conical face of which one cone element is perpendicular to said first and second axes, means for oscillating the support about said first axis to cause said element of the wheel to traverse a plane perpendicular to said first and second axes, means including a member movable about said first axis in time with oscillation of the support for oscillating the wheel head on the wheel support about said second axis, and a tool support adapted to support an edged cutting tool with a sharpening surface thereof, which contains a cutting edge, disposed substantially in said plane for traversal by said conical face of the wheel during oscillation of the wheel support. In the preferred embodiment a cam is employed for oscillating the wheel head on the support, and this cam is conveniently geared to another cam which comprises the means for oscillating the support, so that the two cams operate in correctly timed relationship.

The foregoing and other objects of the invention will appear from the following description made with reference to the accompanying drawings, wherein:

Fig. 2 is a fragmentary vertical sectional view taken in the plane 2—2 of Fig. 1;

Fig. 3 is a fragmentary vertical sectional view substantially in a plane parallel to that of Fig. 1;

Figure 6:
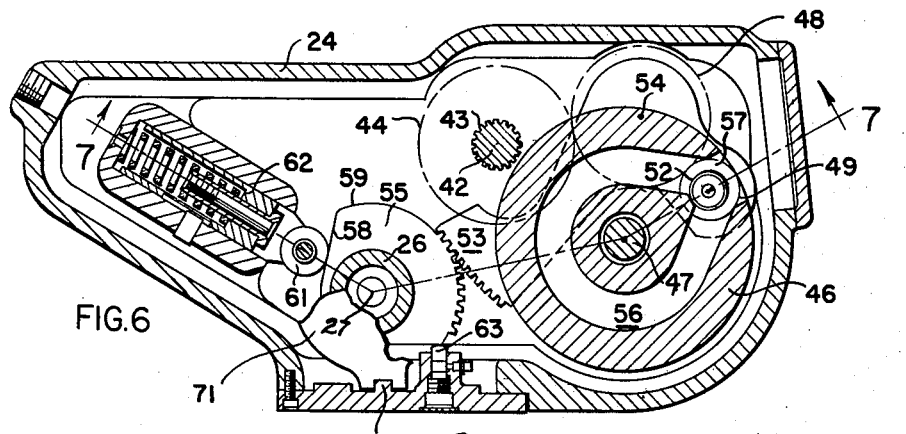
Figure 7:
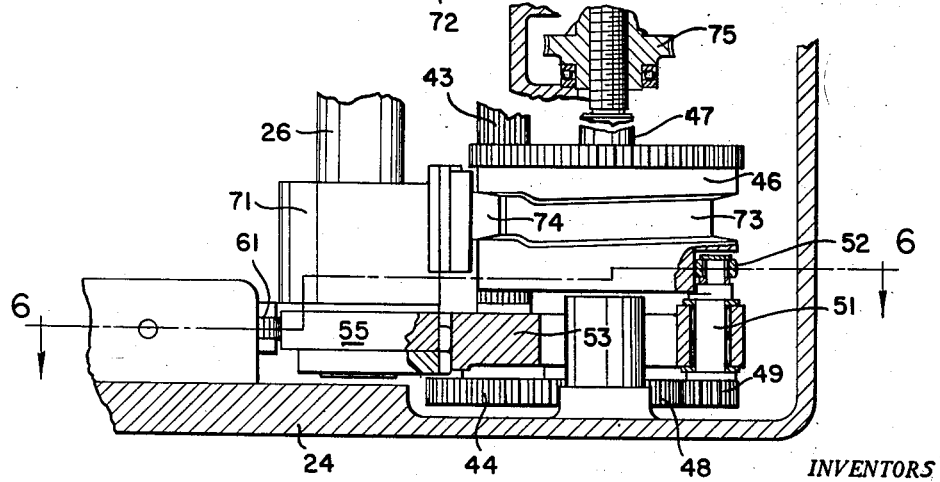

Fig. 6 is a horizontal section in the planes designated by section lines 6—6 of Figs. 3 and 7; and Fig. 7 is a vertical section in the planes designated 7—7 in Fig. 6.

Figure 1:
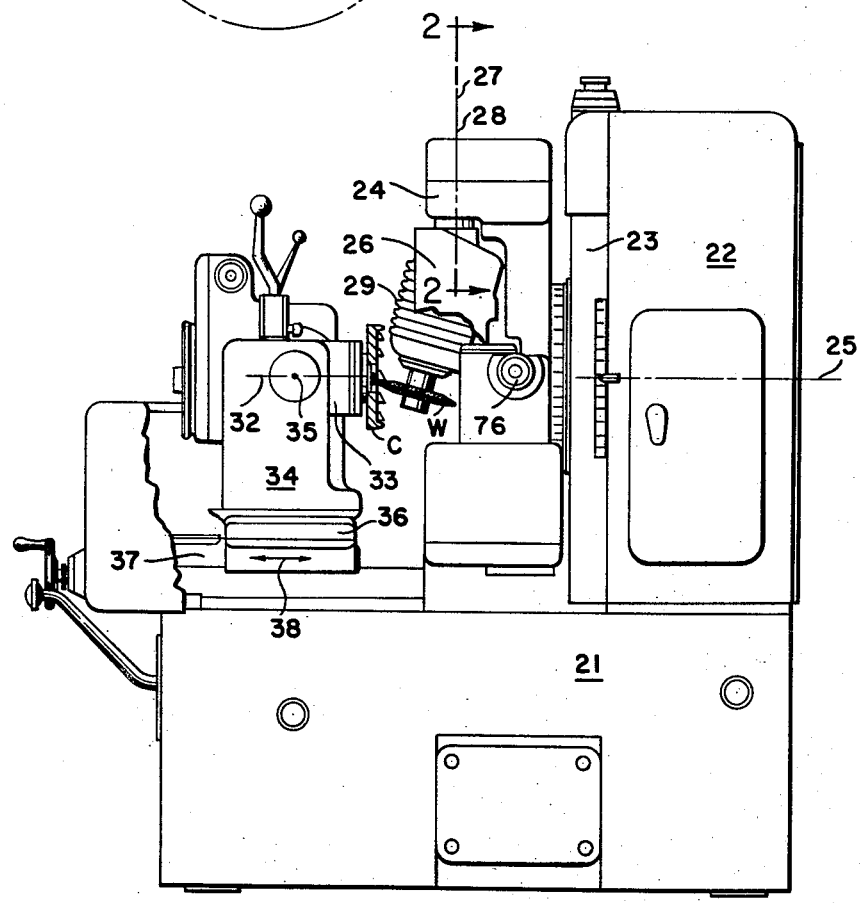
Fig. 1 is a front elevation of the sharpening machine with the cutter mounted thereon appearing in section.
Figure 5:
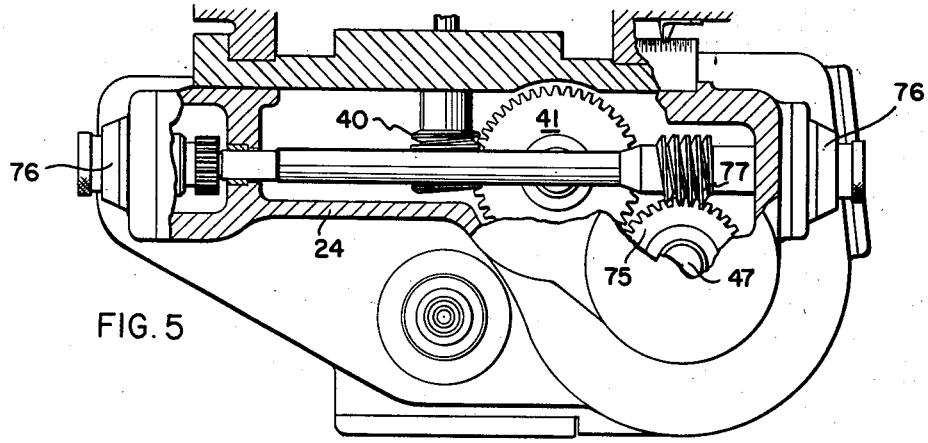
Fig. 5 is a horizontal section in offset planes designated by section line 5—5 of Fig. 3.

The machine shown in Figs. 1 and 2 comprises a frame 21 having a column 22 with vertical ways along which a slide 23 is adjustable. A turret 24 is adjustable angularly on the slide about a horizontal axis 25 and carries a member 26 for oscillation thereon about an axis 27 that is perpendicular to axis 25. The member 26 is also movable on turret 24 along axis 27. A wheel head 29 is mounted on anti-friction bearings on trunnions 30 on member 26 for oscillation about an axis 28, which parallels axis 27. The wheel head journals the spindle of an abrasive wheel W and contains the drive motor for the spindle. The active surface of the wheel is conical and grinds to the plane 31, Fig. 3, which is perpendicular to axis 27, as the wheel is oscillated back and forth about that axis across the sharpening face of the tool. In the illustration the tool being sharpened is a multi-bladed face mill cutter C, of the kind commonly used for cutting spiral bevel gears.

During the sharpening operation the wheel W is periodically swung about axis 27 far enough to clear the cutter to permit indexing the latter about its axis 32 to bring successive ones of its blades into position to be sharpened, and to permit dressing of the wheel by suitable means, not shown, which preferably are mounted on turret 24.

The tool C is mounted on a work spindle that is journaled on axis 32 in a work head 33. This head is adjustable upon a turret 34 about a horizontal axis 35 which intersects axis 32 at right angles, and the turret is adjustable on a cross-slide 36 about a vertical axis that intersects both axis 32 and axis 35. The cross-slide is adjustable in a direction perpendicular to the plane of Fig. 1 on a sliding base 37 which is adjustable on frame 21 in the direction of arrow 38. By the aforementioned adjustments that are provided for the wheel head 29 and the work head 33, either a face mill cutter C or a disc cutter mounted on the work spindle may be brought into position to have its blades sharpened to the desired hook angle and rake angle.

The abrasive wheel W is oscillated about axes 27 and 28 by a motor 39 mounted on the turret 24. A worm 40 on the motor shaft drives a worm wheel 41 secured to a shaft 42 that is journaled in the turret. The shaft has an elongated pinion section 43, and to the lower end of the shaft are secured gears 44 and 45. The pinion 43 drives a cam 46, Figs. 6 and 7, which has mating gear teeth, the cam being rotable on a shaft 47 which parallels shaft 42. Gear 44 drives an idler gear 48 which in turn drives a pinion 49 whose shaft 51 carries an eccentric roller 52. The shaft 51 is journaled in an arm 53 which is mounted in the turret to swing about an axis 54 parallel to shafts 42 and 47. The idler 48 also rotates on this axis 54. The arm 53 has a segment of gear teeth meshing with a pinion segment 55 that is keyed to the oscillating member 26. Formed in the lower face of cam 46 is a recessed cam track 56 which engages the eccentric 52. This track has a circular arc dwell portion and an non-circular active portion at whose center the track is interrupted by an opening 57.

The segment 55 on oscillatable member 26 has a cam formation, comprising a rise 58 and a circular arc dwell portion 59, engaged by roller 61 of a spring-pressed plunger assembly 62 carried by the turret. When in the position shown in Fig. 6, the pressure means 61—62 acts on cam rise 58 to urge the member 26 clockwise to a limit position determined by a hydraulically cushioned stop 63.

The gear 45 drives an idler gear 64 which in turn drives a pinion 65 secured to a shaft 66 that is rotatable within member 26 on axis 27. Affixed to the upper end of the shaft is a cam 67 having two concentric or dwell surfaces which are of different radius. A follower roller 68 mounted on the wheel head 29 is held engaged with the cam 67 by a spring 69, which acts between oscillating member 26 and wheel head 29.

As shown in Figs. 3 and 6 the member 26 is journaled on anti-friction bearings for rotation in a slide 71 which is movable in the direction of axis 27 along a guideway 72 of the turret. The slide is moved by the cam 46 which has a peripheral track 73 in which is engaged a follower roller 74 mounted on the slide. The shaft 47 on which the cam is rotable is non-rotatable but is movable axially. For effecting such axial motion a worm wheel 75, which is rotatable but is held against axial motion in the turret, is screw-threaded to shaft. The worm wheel may be rotated manually by turning either one of knobs 76 which are connected to a worm 77 meshing with the wheel.

Figure 4:
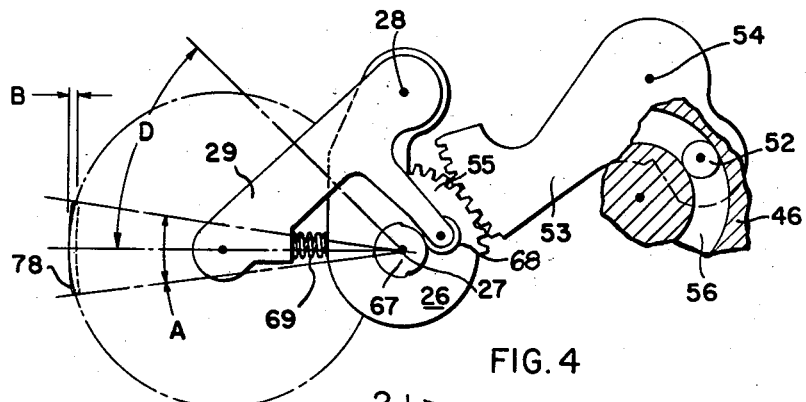
Fig. 4 is a diagrammatic view to illustrate the operation of the machine.

The operation of the machine will now be described with reference primarily to the diagram, Fig. 4. The eccentric 52, rotated by motor 39 through gearing 40, 41, 44, 48, 49, causes the arm 53 to oscillate about axis 54, and, through pinion segment 55, causes the member 26 to swing back and forth about axis 27. The cam 67, driven through gearing 45, 64, 65 in time with rotation of the eccentric, is effective to swing the head 29 about axis 28 to vary the radial distance of wheel W from axis 27, between opposite swings of member 26. Thus the active surface of the wheel is moved in the closed path indicated by dotted line 78, following a different path across the sharpening surface of tool C on each stroke or swing about axis 27 than on the preceding stroke. The amplitude of motion of the wheel is exaggerated in Fig. 4. In practice the amplitude of swing A is a little more than ten degrees, while the offset B between the forward and return strokes is preferably about twenty thousandths of an inch. Of course these values can be varied as the machine designer desires. During the aforementioned oscillation of the wheel, which takes place while the eccentric 52 is in the circular arc or dwell portion of cam track 56, the pressure roller 61 rides idly on the dwell surface 59 of segment 55.

The cam 46 is rotated continuously through gearing 40, 41, 43, and as it approaches the position shown in Fig. 6, the non-circular part of track 56 acts to swing the eccentric 52 and arm 53, counterclockwise about axis 54. In this action the mean position of oscillation of wheel W is swung through the angle D, Fig. 4, which in practice is slightly more than forty-five degrees. When the eccentric reaches the discontinuity 57, and is no longer confined by the cam track 56, the segment 55 has been swung far enough that the pressure roller 61 engages cam rise 58. The member 26 is then swung into and held in its limit position against stop 63. In this position the wheel W is clear of the tool C and may be dressed or the tool indexed about its axis 32. When the cam 46 turns further, track 56 again confines the eccentric, and the wheel head is swung back to operative relative relationship with the tool, thus starting a new sharpening cycle.

The cam track 73 is so formed and so related to track 56 that during the sharpening cycle the slide 71, and the wheel W with it, are fed slowly, upwardly in Figs. 3 and 7, so that on successive passes over the tool the wheel removes thin layers of stock from the sharpening face of tool C. Then, as the cycle is being concluded, when the eccentric 52 is about to enter the discontinuity 57, the cam track returns the slide 71 to its starting position. Prior to a wheel dressing operation the machine is stopped with the parts in the position shown in Fig. 6 and the cam 46 is adjusted axially, by turning one of knobs 76, to shift the slide far enough to provide wheel stock for dressing.

It will be understood that the foregoing disclosure is made by way of example, to illustrate and explain the inventive principles involved, and not by way of limitation.

What we claim as our invention is:

1. A tool sharpening machine comprising a frame having a wheel support pivoted thereto for oscillation about a first axis, an abrasive wheel head carried by the support and pivoted thereto for oscillation about a second axis parallel to the first axis, a spindle for an abrasive wheel journaled in the head for rotation about a third axis inclined at an acute angle to said first axis, an abrasive wheel on said spindle having a conical face of which one cone element is perpendicular to said first and second axes, means for oscillating the support about said first axis to cause said element of the wheel to traverse a plane perpendicular to said first and second axes, means including a member movable about said first axis in time with oscillation of the support for oscillating the wheel head on the wheel support about said second axis, and a tool support adapted to support an edged cutting tool with a sharpening surface thereof, which contains a cutting edge, disposed substantially in said plane for traversal by said conical face of the wheel during oscillation of the wheel support.

2. A tool sharpening machine according to claim 1 in which said means for oscillating the wheel head comprises a cam so geared to said means for oscillating the wheel support as to make one revolution per each oscillation of the wheel head, a follower for said cam on the wheel head, and resilient means effective between the wheel support and the wheel head for holding the follower against the cam.

3. A tool sharpening machine according to claim 2 in which said cam is so shaped as to cause the wheel to move toward and away from said first axis between successive strokes of the oscillation about said first axis.

4. The method of sharpening an edged cutting tool which has a plane sharpening surface bounded on at least one side by a cutting edge, by a relative stroking motion of a rotating abrasive wheel back and forth about an axis perpendicular to said surface, with a conical surface of said wheel having a cone element thereof disposed in the plane of said surface, which method comprises effecting back and forth motions of the wheel parallel to said plane toward and away from said axis in time with said stroking motion whereby during opposite strokes thereof the wheel traverses said cutting edge in different paths.

5. The method of claim 4 in which the back and forth motions are so timed as to take place at opposite terminal phases of said stroking motion.

References Cited in the file of this patent
UNITED STATES PATENTS

| | | |
|---|---|---|
| 1,187,753 | Lumsden | June 20, 1916 |
| 1,431,024 | Munthe | Oct. 3, 1922 |
| 1,621,553 | Miller | Mar. 22, 1927 |
| 1,698,909 | Currier | Jan. 15, 1929 |
| 1,830,971 | Taylor | Nov. 10, 1931 |
| 2,195,065 | Wallace | Mar. 26, 1940 |
| 2,224,959 | Galloway | Dec. 17, 1940 |
| 2,272,974 | Indge | Feb. 10, 1942 |
| 2,436,466 | Wilson | Feb. 24, 1948 |
| 2,471,443 | Munro | May 31, 1949 |

FOREIGN PATENTS

| | | |
|---|---|---|
| 453,772 | France | Apr. 12, 1913 |